US 12,184,032 B2

(12) United States Patent
Fujimoto et al.

(10) Patent No.: US 12,184,032 B2
(45) Date of Patent: Dec. 31, 2024

(54) LASER APPARATUS

(71) Applicant: KIMMON KOHA CO., LTD., Tokyo (JP)

(72) Inventors: Yasushi Fujimoto, Chiba (JP); Paul Binun, Tokyo (JP); Shinji Motokoshi, Osaka (JP); Masamori Nakahara, Tokyo (JP); Takeshi Hamada, Tokyo (JP)

(73) Assignee: KIMMON KOHA CO., LTD., Tokyo (JP)

( * ) Notice: Subject to any disclaimer, the term of this patent is extended or adjusted under 35 U.S.C. 154(b) by 524 days.

(21) Appl. No.: 17/550,392

(22) Filed: Dec. 14, 2021

(65) Prior Publication Data
US 2022/0102933 A1 Mar. 31, 2022

Related U.S. Application Data

(63) Continuation of application No. PCT/JP2020/026352, filed on Jul. 6, 2020.

(30) Foreign Application Priority Data

Jul. 9, 2019 (JP) ................................. 2019-127329

(51) Int. Cl.
*H01S 3/10* (2006.01)
*H01S 3/067* (2006.01)
(Continued)

(52) U.S. Cl.
CPC ...... *H01S 3/10076* (2013.01); *H01S 3/06716* (2013.01); *H01S 3/081* (2013.01);
(Continued)

(58) Field of Classification Search
CPC .. H01S 3/10076; H01S 3/06716; H01S 3/081; H01S 3/0816; H01S 3/083;
(Continued)

(56) References Cited

U.S. PATENT DOCUMENTS 4,233,571 A * 11/1980 Wang .................... G02F 1/3538
372/98
4,429,393 A * 1/1984 Giuliano ................. H01S 3/083
359/334

(Continued)

FOREIGN PATENT DOCUMENTS

EP 4106116 A1 12/2022
JP H04-134432 A 5/1992
(Continued)

OTHER PUBLICATIONS

Cronin-Golomb, M. et al: "Laser With Dynamic Holographic Intracavity Distortion Correction Capability", Applied Physics Letters, American Institute of Physics, 2 Huntington Quadrangle, Melville, NY 11747, vol. 41, No. 3, Aug. 1, 1982, p. 219/220, XP000706184, DOI: 10.1063/1.93489.

(Continued)

*Primary Examiner* — Kinam Park
(74) *Attorney, Agent, or Firm* — Osha Bergman Watanabe & Burton LLP

(57) ABSTRACT

A laser apparatus includes: a laser oscillator that includes a mirror and emits a laser beam; and an external resonator that includes a nonlinear optical crystal that functions as a phase conjugate mirror. The phase conjugate mirror reflects the laser beam and produces a phase conjugate wave that reaches the mirror of the laser oscillator, and the mirror of the laser oscillator and the phase conjugate mirror cause laser oscillation such that a wavelength and a phase of the laser beam oscillated by the laser oscillation are automatically fixed.

11 Claims, 3 Drawing Sheets

(51) Int. Cl.
  *H01S 3/081* (2006.01)
  *H01S 3/083* (2006.01)
  *H01S 3/094* (2006.01)
  *H01S 3/0941* (2006.01)
  *H01S 3/109* (2006.01)
  *H01S 3/13* (2006.01)
  *H01S 3/16* (2006.01)

(52) U.S. Cl.
  CPC ............ *H01S 3/0816* (2013.01); *H01S 3/083* (2013.01); *H01S 3/094003* (2013.01); *H01S 3/09415* (2013.01); *H01S 3/109* (2013.01); *H01S 3/13* (2013.01); *H01S 3/1613* (2013.01)

(58) Field of Classification Search
  CPC ........... H01S 3/094003; H01S 3/09415; H01S 3/109; H01S 3/13
  See application file for complete search history.

(56) References Cited

U.S. PATENT DOCUMENTS

| | | | | |
|---|---|---|---|---|
| 5,007,066 | A * | 4/1991 | Eda | ........................... H01S 5/14 |
| | | | | 372/75 |
| 2005/0094250 | A1* | 5/2005 | Dane | .................... C21D 10/005 |
| | | | | 359/334 |
| 2006/0198404 | A1* | 9/2006 | Henrichs | ............. H01S 5/18391 |
| | | | | 372/100 |
| 2009/0046351 | A1* | 2/2009 | Tamaki | ..................... G02F 1/37 |
| | | | | 359/326 |

FOREIGN PATENT DOCUMENTS

| | | |
|---|---|---|
| JP | H04-342182 A | 11/1992 |
| JP | 2006-019603 A | 1/2006 |
| JP | 2015-170795 A | 9/2015 |
| WO | 2015/174388 A1 | 11/2015 |

OTHER PUBLICATIONS

Fischer, B. et al.: "Photorefractive oscillators", IEEE Journal of Quantum Electronics, IEEE, USA, vol. 25, No. 3, Mar. 1, 1989, pp. 550-569, XP011478602, DOI: 10.1109/3.18568.

Extended European Search Report issued in corresponding European Application No. 20836846.4, dated Jun. 30, 2023 (9 pages).

"Laser oscillator using with self-pumped phase conjugate-mirror" by McFarland and Steel (Optics Letter vol. 8 No. 4 ) Apr. 1983 (3 pages).

Office Action issued in counterpart Japanese Patent Application No. JP 2019-127329 A dated Sep. 11, 2020 (4 pages).

"Research for high performance of solid laser with high average output" by Eiji Yoshida, pp. 164 to 165, Jan. 1999 (2 pages).

"Renaissance of YAG laser construction method" by Kunio Yoshida and Eiji Yoshida (Laser Research vol. 21 No. 8 pp. 8 to 15) Aug. 1993 (8 pages).

"Beam quality control for a high output semiconductor laser using a photo-refractive phase conjugate mirror" by Takashige Omatsu (Laser Research vol. 30 No. 4 pp. 177 to 181) Apr. 2002 (5 pages).

International Search Report issued in corresponding International Application No. PCT/JP2020/026352 dated Sep. 24, 2020 (7 pages).

Written Opinion issued in corresponding International Application No. PCT/JP2020/026352 dated Sep. 24, 2020 (4 pages).

* cited by examiner

LASER APPARATUS

BACKGROUND

Technical Field

The present invention relates to a laser apparatus for obtaining a laser beam.

Description of Related Art

In order to obtain laser beam in visible region and ultraviolet region, higher harmonic wave generating technology using nonlinear optical crystal in addition to laser oscillator has been used widely. As shown in FIG. 2, a laser oscillator includes a resonator structure in which a laser medium 51 is sandwiched between two high reflectance mirrors 52 and 53 to obtain higher harmonic wave 55 through a nonlinear optical crystal 54 for generating higher harmonic wave. In order to obtain laser beam in visible region and ultraviolet region with high efficiency, together with highly precise adjustment for the laser resonator, there is a need to perform highly precise alignment adjustment for angle, temperature, and the like of the nonlinear optical crystal for generating higher harmonic wave.

In order to generate higher harmonic waves with high efficiency, together with the use of the nonlinear optical crystal having large nonlinear optical constant, it is necessary to make intensity of laser beam higher. For that reason, an internal resonator type in which the nonlinear optical crystal 54 is installed in the laser resonator as shown in FIG. 3, an external resonator type in which only the nonlinear optical crystal is installed in another resonator, and the like, have been used. In the internal resonator and the external resonator, since the laser beam is shut-in by two or multiple mirrors, it is possible to increase intensity of the laser beam by about 3 to 5 digits, as compared with a case where there is no resonator.

Non-patent Literature 1 has been introducing experimental examples in which laser oscillation was performed by using high pressure gas or transparent fluid material for phase conjugate mirror. Non-patent Literature 2 has been introducing experimental examples in which the oscillation characteristics of a semiconductor laser was improved by using phase conjugate wave generated from a nonlinear optical crystal.

Patent Literature 1 discloses a laser apparatus in which a phase conjugate light generating element composed of a nonlinear medium having light refractive effect is inserted in round trip optical path of oscillation laser beam or wavelength conversion beam within the resonance system, and one end of an optical fiber is placed at its neighborhood to make oscillation laser beam or wavelength-converted beam into pumping beam and to generate phase conjugate beam traveling along a path of correctly reverse direction relative to guide beam entering a phase conjugate light generating element from this one end so as to inject the beam with high energy density into one end of an optical fiber and to take out the beam from its other end (Abstract).

PATENT LITERATURE

Patent Literature 1: JP H04-342182A

Non-Patent Literature

Non-patent literature 1: "Renaissance of YAG laser construction method" by Kunio Yoshida and Eiji Yoshida (Laser Research Vol. 21 No. 8 Pages. 8 to 15) August 1993

Non-patent literature 2: "Beam quality control for a high output semiconductor laser using a photo-refractive phase conjugate mirror" by Takashige Omatsu (Laser Research Vol. 30 No. 4 Pages. 177 to 181) April 2002

However, in the conventional higher harmonic wave generating laser apparatus using the internal resonator or the external resonator, in order to make the apparatus operate stably with high output, in addition to precise alignment of the nonlinear optical crystal, it is necessary to perform highly precise control and adjustment for optical axis and resonator length of the resonator, and hence, complex and highly precise control and adjustment are required.

The laser apparatus in Patent Literature 1 includes a constitution (FIG. 1) in which the phase conjugate light generating element is included in the laser resonance system and contributes only to laser oscillation. The phase conjugate light generating element and the nonlinear optical crystal for conversing wavelength are separately arranged, and the phase conjugate light generating element is configured not to contribute the laser oscillation (FIG. 3).

The laser resonator using the phase conjugate mirror is configured to contribute only to laser oscillation in the laser resonator, as in Nonpatent Literatures 1 and 2.

SUMMARY

One or more embodiments of the present invention provide a laser apparatus to make complex and highly precise control and adjustment unnecessary and to make stable laser beam output possible, by using an optical material as phase conjugate mirror.

One or more embodiments of the present invention have been achieved on the basis of knowledge acquired as a result of diligent research and examination made by the present inventors. Namely, a matter that phase conjugate wave is generated (or produced) by making a laser beam enter an optical material to form in the inside thereof coarse/fine distribution of period equivalent to a wavelength of the laser beam, has been known. The principle of the coarse/fine distribution formation is described as nonlinear optical effect, such as optoacoustic effect, photo-refractive effect, induced brilliant scatter, and the like, and the phase conjugate wave is generated relative to one laser beam which has entered the optical material. The features of the phase conjugate wave are to have phase distribution in which space phase distribution of the incident laser beam is reversed, and to generate passively a beam propagating in the truly reverse direction relative to an optical axis of the incident laser beam. For this reason, an optical material forming the phase conjugate wave is referred as a phase conjugate mirror. One or more embodiments of the present invention have been attained by obtaining a knowledge that the phase conjugate mirror is used as a mirror in one side of a laser resonator to adjust passively the optical axis, whereby the precise alignment adjustment for the optical material, and the control and adjustment for an optical axis of the resonator and the resonator length are made unnecessary and stable laser beam output can be expected.

In one or more embodiments, a laser apparatus includes a laser oscillator including a mirror, and an external resonator including a nonlinear optical crystal that functions as a phase conjugate mirror relative to a laser beam entered from the laser oscillator, wherein a phase conjugate wave reflected on the phase conjugate mirror reaches the mirror of the laser oscillator, whereby the mirror and the phase conjugate mirror face each other automatically to cause laser oscillation, and a wavelength and phase of the laser beam by the laser oscillation are locked passively (or fixed automatically).

According to the laser apparatus, the phase conjugate wave reflected on the phase conjugate mirror by the nonlinear optical crystal in the external resonator propagates in the truly reverse direction relative to the optical axis of the laser beam entered from the laser resonator to adjust passively the optical axis until arriving to (or reaching) the mirror of the laser oscillator, and the phase conjugate mirror and the mirror of the laser oscillator face each other automatically to cause laser oscillation, whereby wavelength and phase of the laser beam oscillating in the laser oscillator are locked passively. In this way, the laser beam is output stably even without performing precise alignment for the nonlinear optical crystal and highly precise control and adjustment for an optical axis and the like of the resonator. In this way, the laser oscillation is caused between the phase conjugate mirror by the nonlinear optical crystal disposed in the external resonator and the mirror in the laser oscillator, thus it is possible to make a stable laser beam output.

In the above-mentioned laser apparatus, the nonlinear optical crystal has a higher harmonic wave generating function, and the external resonator is configured to serve as a higher harmonic wave generator, whereby it is possible to obtain the stable laser beam of high output in visible region and ultraviolet region by simple constitution.

According to the laser apparatus of one or more embodiments of the present invention, by using an optical material as a phase conjugate mirror, complex and highly precise control and adjustment becomes unnecessary, and stable laser beam output becomes possible.

DETAILED DESCRIPTION OF EMBODIMENTS

Figure 1:
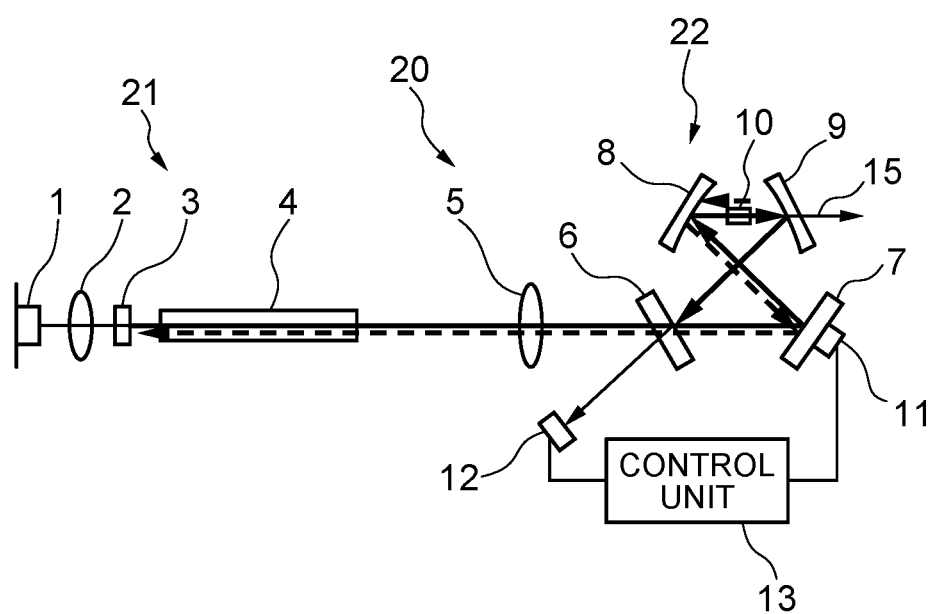
FIG. 1 is an optical path diagram showing schematically a laser apparatus according to one or more embodiments.
Figure 2:
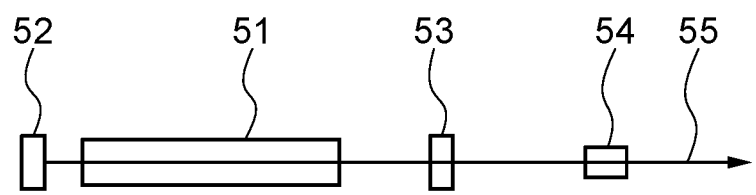
FIG. 2 is an optical path diagram showing schematically a resonator structure of a conventional laser oscillator.
Figure 3:
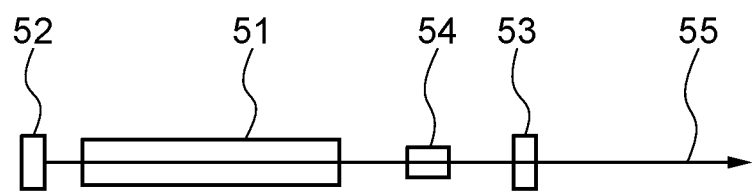
FIG. 3 is an optical path diagram showing schematically a conventional example in which a nonlinear optical crystal for generating a higher harmonic wave is installed in a laser resonator.

Hereinafter, embodiments for executing the present invention will be described with reference to drawings. FIG. 1 is an optical path diagram showing schematically a laser apparatus according to one or more embodiments.

As shown in FIG. 1, a laser apparatus 20 according to one or more embodiments includes a semiconductor laser 1 for excitation (i.e., an excitation light source), a condensing lens 2, a mirror 3, a laser medium 4, a matching lens 5, flat mirrors 6 and 7, concave mirrors 8 and 9, a nonlinear optical crystal 10, a piezo-electric element 11, a light receiving element 12, and a control unit 13.

The semiconductor laser 1 for excitation, the condensing lens 2, the mirror 3, and the laser medium 4 constitute a laser oscillator 21. The condensing lens 2 collects light beams from the semiconductor laser 1 for excitation into the laser medium 4 through the mirror 3.

The flat mirrors 6 and 7 and the concave mirrors 8 and 9 constitute a ring resonator 22 as an external resonator for performing wavelength conversion. The nonlinear optical crystal 10 is disposed on an optical axis in the ring resonator 22 so as to be positioned in a confocal point of the concave mirrors 8 and 9, is composed of, for example, BBO ($\beta$-BaB$_2$O$_4$), LBO (LiB$_3$O$_5$), or CLBO (CsLiB$_6$O$_{10}$), generates a higher harmonic wave, and also, generates a phase conjugate wave.

A fundamental wave laser beam emitted from the laser medium 4 travels in an arrow direction indicated with a solid line in FIG. 1 and is led to the ring resonator 22 including the nonlinear optical crystal 10 through the matching lens 5. The matching lens 5 is arranged so as to make a mode of the incident laser beam overlap with a mode in the ring resonator 22 and is subjected to position adjustment so as to collect light beams at the confocal point of the concave mirrors 8 and 9 and to make light intensity become maximum at a position of the nonlinear optical crystal 10.

In order to increase the light intensity within the ring resonator 22, the flat mirrors 6 and 7 and the concave mirrors 8 and 9 that constitute the ring resonator 22 have a high reflection factor of 99.9% or more relative to the wavelength of the fundamental wave laser beam. The laser beam with the high light intensity is incident on the nonlinear optical crystal 10, whereby the nonlinear optical crystal 10 generates a phase conjugate wave according to nonlinear optical effect and functions as a phase conjugate mirror.

The phase conjugate wave generated in the nonlinear optical crystal 10 advances exactly in the truly reverse direction relative to that of the laser beam entering the nonlinear optical crystal 10, then, is reflected on the concave mirror 8 and the mirror 7, passes through the mirror 6 in an arrow direction indicated with a broken line in FIG. 1, and arrives to the mirror 3 through the matching lens 5 and the laser medium 4. For this reason, the nonlinear optical crystal 10 functioned as the phase conjugate mirror and the mirror 3 face each other automatically and passively, so that laser resonance is caused, and laser oscillation is resultingly caused. In this way, the wavelength and the phase of the fundamental wave laser beam having caused the laser oscillation are locked passively, and a second higher harmonic wave is generated by the nonlinear optical crystal 10 and is emitted to the outside along an optical path 15 from the concave mirror 9. Thus, the laser beam in ultraviolet region by the second higher harmonic wave is output, and the laser beam in visible region by non-wavelength-converted wave is output.

A part of the reflected beam from the concave mirror 9 in the ring resonator 22 transmits through the mirror 6, and then, the partial transmitted beam is received by the light receiving element 12. There is a condition that the resonator length of the ring resonator 22 is a multiple of the fundamental wave wavelength, and hence by using a Pound-Drever-Hall method, a Hansch-Couillaud method, or the like, a difference in polarization of the fundamental wave in the ring resonator 22 is measured with the light receiving element 12. Based on the measurement result, the control unit 13 sends electric signals to the piezo-electric element 11, and the piezo-electric element 11 controls the resonator length by driving the flat mirror 7, thereby to stabilize the wavelength conversion output relative to the variation of environment such as ambient temperature.

According to the laser apparatus in one or more embodiments, the nonlinear optical crystal 10 functioned as the phase conjugate mirror in the external resonator (ring resonator) 22 is arranged, thereby to output a stable laser beam, and even without performing precise alignment adjustment for the nonlinear optical crystal and highly precise control and adjustment for the optical axis and the like of the laser oscillator 21, the laser beam is output stably.

By using the nonlinear optical crystal provided with both functions of generating higher harmonic wave and generating phase conjugate wave, the laser beams in ultraviolet region and visible region are stably and highly output. With these, it becomes possible to make an apparatus simple and to make a cost low. Moreover, since the fluctuation of the ring resonator accompanying the variation of environment such as ambient temperature, is restrained, stable and high-output laser operation can be performed.

The advantageous effects of the laser apparatus according to one or more embodiments is further described. It has been known that nonlinear optical crystal is disposed in a ring resonator in order to generate higher harmonic wave. However, it has been never known prior to the filing of the present application that such configuration constitutes phase conjugate mirror. Furthermore, it has been never anticipated at all that the beam reflected from the phase conjugate mirror in the ring resonator returns to a core of the optical fiber as laser medium precisely and exactly. Namely, the present application has revealed for the first time that the accurate and precise returning of the beam from the phase conjugate mirror by the nonlinear optical crystal 10 in the ring resonator 22 to the mirror 3 through the optical fiber of the laser medium 4 in the laser oscillator 21 is performed automatically in the laser apparatus 20 in FIG. 1.

A phase conjugate mirror cannot be constituted with a continuous wave laser beam or a weak pulsed laser beam, or the constitution is not easy with such laser beam, however, by obtaining a laser beam of high light intensity within the ring resonator, it is possible to constitute the phase conjugate mirror reliably. Furthermore, although it cannot be guaranteed that multiple reflection beams in the ring resonator pass on the same optical path, among those optical paths it is possible to automatically select an optical path with the highest effect.

For example, in the case of collecting light beams into an optical fiber with a core of 4 μm by using a lens with a similar diameter and a focal distance of 10 mm, if the light beam collected has a lateral deviation of 2 μm (a loss of 50% or more) by large estimation, the laser oscillation becomes impossible. An amount of the lateral deviation is indicated by $f\theta$ where the focal distance is f and an inclination angle of the light beam is $\theta$. The inclination angle of the light beam corresponding to the lateral deviation of 2 μm is 0.2 mrad (1 degree is 17.5 mrad). Namely, although even an inclination error of about 1/100 degree is not permitted, angle adjustment for the inclination error of 1/100 degree or less is executed automatically without special operation.

EXAMPLE

In the present example, the laser medium 4 in FIG. 1 is composed of a fluoride fiber (i.e., a fluoride material) to which Pr ions are added, but other laser media may be used. A semiconductor laser with an oscillation wavelength of 445 nm was used as the semiconductor laser 1 for excitation. The oscillation wavelength is selected appropriately in accordance with the absorption wavelength of the laser medium 4. The nonlinear optical crystal 10 was BBO.

Light beams with an oscillation wavelength of 445 nm from the semiconductor laser 1 in FIG. 1 were collected by the lens 2 and were made to enter the laser medium 4 to excite the laser medium 4. Then, a fundamental wave laser beam with a wavelength of 638 nm was emitted from the laser medium 4. The fundamental wave laser beam entered the ring resonator 22 through the matching lens 5, and then, a second higher harmonic wave with a wavelength of 319 nm was output from the mirror 9. Relative to a power of 4097 mW of the semiconductor laser 1, an output of 413 mW of wavelength-converted laser beam with a wavelength of 319 nm was obtained.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

INDUSTRIAL APPLICABILITY

According to one or more embodiments of the present invention, since a laser beam is output stably with simple constitution, it become possible to simplify laser apparatus and to make the cost low.

REFERENCE SIGNS LIST 1 semiconductor laser for excitation
2 condensing lens
3 mirror
4 laser medium
5 matching lens
6, 7 flat mirror
8, 9 concave mirror
10 nonlinear optical crystal
20 laser apparatus
21 laser oscillator
22 ring resonator, external resonator

What is claimed is:

1. A laser apparatus comprising:
a laser oscillator that comprises a mirror and a laser medium, and emits a laser beam; and
an external resonator that comprises a nonlinear optical crystal that functions as a phase conjugate mirror, wherein
the phase conjugate mirror reflects the laser beam and produces a phase conjugate wave that reaches the mirror of the laser oscillator through the laser medium, and
the mirror of the laser oscillator and the phase conjugate mirror cause laser oscillation through the laser medium such that a wavelength and a phase of the laser beam oscillated by the laser oscillation are automatically fixed.

2. A laser apparatus comprising:
a laser oscillator that comprises a mirror and a laser medium, and emits a laser beam; and
an external resonator that increases a light intensity of the laser beam and comprises a nonlinear optical crystal, wherein
the nonlinear optical crystal functions as a phase conjugate mirror on which the laser beam is reflected to travel along a reverse optical path to reach the mirror of the laser oscillator through the laser medium,
the mirror of the laser oscillator and the phase conjugate mirror cause laser oscillation through the laser medium such that a wavelength and a phase of the laser beam oscillated by the laser oscillation are automatically fixed, and
the nonlinear optical crystal produces a higher harmonic wave of the laser beam oscillated by the laser oscillation and outputs the higher harmonic wave from the external resonator.

3. The laser apparatus according to claim 1, wherein the external resonator is composed of a ring resonator, and
the nonlinear optical crystal is disposed on an optical axis in the ring resonator.

4. The laser apparatus according to claim 1, wherein the nonlinear optical crystal is BBO (β-BaB$_2$O$_4$), LBO (LiB$_3$O$_5$), or CLBO (CsLiB$_6$O$_{10}$).

5. The laser apparatus according to claim 1, wherein
the laser oscillator comprises a semiconductor laser as an excitation light source and a fiber as the laser medium, and
the mirror is disposed between the semiconductor laser and the fiber.

6. The laser apparatus according to claim 5, wherein the fiber is composed of a fluoride material to which Prions are added.

7. A laser oscillating method using a laser oscillator that comprises a mirror and a laser medium, and an external resonator that comprises a nonlinear optical crystal, the method comprising:
emitting from the laser oscillator a laser beam that reaches the external resonator that increases a light intensity of the laser beam, wherein
the nonlinear optical crystal functions as a phase conjugate mirror on which the laser beam is reflected to travel along a reverse optical path to reach the mirror of the laser oscillator through the laser medium, and
once the mirror of the laser oscillator and the phase conjugate mirror cause laser oscillation through the laser medium, outputting from the external resonator a higher harmonic wave of the laser beam oscillated by the laser oscillation, wherein the higher harmonic wave is generated by the nonlinear optical crystal.

8. The laser oscillating method according to claim 7, wherein
the external resonator is composed of a ring resonator, and
the nonlinear optical crystal is disposed on an optical axis in the ring resonator.

9. The laser oscillating method according to claim 7, wherein
the nonlinear optical crystal is BBO (β-BaB$_2$O$_4$), LBO (LiB$_3$O$_5$), or CLBO (CsLiB$_6$O$_{10}$).

10. The laser oscillating method according to claim 7, wherein
the laser oscillator comprises a semiconductor laser as an excitation light source and a fiber as the laser medium, and
the mirror is disposed between the semiconductor laser and the fiber.

11. The laser oscillating method according to claim 10, wherein
the fiber is composed of a fluoride material to which Prions are added.

* * * * *